United States Patent
Cairns et al.

(10) Patent No.: US 8,428,106 B2
(45) Date of Patent: Apr. 23, 2013

(54) EFFICIENT METHOD FOR FORMING AND SHARING IMPAIRMENT COVARIANCE MATRIX

(75) Inventors: Douglas A. Cairns, Durham, NC (US);
Yi-Pin Eric Wang, Cary, NC (US);
Håkan Bjorkegen, Täby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1258 days.

(21) Appl. No.: 12/138,655

(22) Filed: Jun. 13, 2008

(65) Prior Publication Data

US 2009/0023437 A1    Jan. 22, 2009

Related U.S. Application Data

(60) Provisional application No. 60/943,975, filed on Jun. 14, 2007.

(30) Foreign Application Priority Data

Jun. 13, 2008    (WO) ................ PCT/US2008/066853

(51) Int. Cl.
*H04B 1/00* (2006.01)
(52) U.S. Cl.
USPC ........... 375/144; 375/142; 375/148; 375/150; 375/346
(58) Field of Classification Search ............ 375/130, 375/140–142, 144, 147, 148, 150, 316, 322, 375/324, 325, 346, 348–350
See application file for complete search history.

(56) References Cited

U.S. PATENT DOCUMENTS

| | | | |
|---|---|---|---|
| 6,363,104 B1 | 3/2002 | Bottomley | |
| 7,830,952 B2 | 11/2010 | Eriksson | |
| 8,098,715 B2 | 1/2012 | Fulghum et al. | |
| 2005/0111528 A1* | 5/2005 | Fulghum et al. | 375/148 |
| 2005/0201447 A1 | 9/2005 | Cairns et al. | |
| 2006/0007990 A1 | 1/2006 | Cozzo et al. | |
| 2006/0268962 A1 | 11/2006 | Cairns et al. | |
| 2007/0104254 A1 | 5/2007 | Bottomley et al. | |
| 2007/0189363 A1 | 8/2007 | Eriksson et al. | |
| 2008/0143589 A1* | 6/2008 | Dankberg et al. | 342/352 |
| 2008/0298437 A1* | 12/2008 | Currivan et al. | 375/144 |

OTHER PUBLICATIONS

International Search Report and Written Opinion mailed Jan. 28, 2009 in corresponding PCT application PCT/US2008/066853.
Bottomley et al, "A Generalized RAKE Receiver for Interference Suppression"; IEEE Journal on Selected Areas of Communications, vol. 18, No. 8, pp. 1536-1545, Aug. 2000.
English translation of Chinese Office Action mailed Feb. 29, 2012 is Chinese application 200880020034.X.

* cited by examiner

*Primary Examiner* — David C. Payne
*Assistant Examiner* — James M Perez
(74) *Attorney, Agent, or Firm* — Nixon & Vanderhye, P.C.

(57) ABSTRACT

The technology comprises method(s) and apparatus for operating a telecommunications system. In its basic form the method comprises providing plural channelization codes for potential use by an uplink receiver; using unused channelization codes of the plural codes to generate an estimate of an impairment covariance matrix; and using the estimate of the impairment covariance matrix to form a processing parameter. For example, the processing parameter can be one or more weight values which, in turn, are can be used for generating a combined output signal.

21 Claims, 11 Drawing Sheets

EFFICIENT METHOD FOR FORMING AND SHARING IMPAIRMENT COVARIANCE MATRIX

This application claims the benefit and priority of U.S. provisional patent application 60/943,975, filed Jun. 14, 2007, entitled "EFFICIENT METHOD FOR SHARING G-RAKE IMPAIRMENT COVARIANCE MATRIX", which is incorporated by reference herein in its entirety. This application is related to U.S. patent application Ser. No. 12/135,268, filed Jun. 9, 2008, entitled "METHOD AND APPARATUS FOR ESTIMATING IMPAIRMENT COVARIANCE MATRICES USING UNOCCUPIED SPREADING CODES", which is incorporated herein by reference in its entirety.

TECHNICAL FIELD

This invention pertains to telecommunications, and particularly to devices such as receivers and equalizers utilized in cellular or wireless telecommunications.

BACKGROUND

In a typical cellular radio system, mobile terminals (also known as mobile stations and mobile user equipment units (UEs)) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with the radio access network.

The radio access network (RAN) covers a geographical area which is divided into cell areas, with each cell area being served by a base station, e.g., a radio base station (RBS), which in some networks is also called "NodeB" or "B node". A cell is a geographical area where radio coverage is provided by the radio base station equipment at a base station site. Each cell is identified by a unique identity within the local radio area, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation or "3G" mobile communication system, which evolved from the Global System for Mobile Communications (GSM), and is intended to provide improved mobile communication services based on Wideband Code Division Multiple Access (WCDMA) technology. UTRAN is essentially a radio access network providing wideband code division multiple access for user equipment units (UEs). The Third Generation Partnership Project (3GPP) has undertaken to evolve further the predecessor technologies, e.g., GSM-based and/or second generation ("2G") radio access network technologies.

With the adoption of release 6 of the WCDMA standard, a new type of uplink user was introduced. This new user was called an "enhanced" uplink (EUL) user. EUL users are characterized by short (10 or 2 ms) transmit time intervals (TTI), single or multi-code transmission, and potentially large transmit powers. These characteristics enable significantly higher peak data rates than what was achievable previously. Unfortunately, such high-power transmissions significantly increase interference for other uplink users.

One way to address the interference is through the use of a generalized RAKE (G-RAKE) receiver. G-RAKE receivers have been employed in WCDMA receivers to combat interference. The interference can be due to self-interference caused by multi-path propagation or other-user/cell interference caused by nearby/remote users (uplink) or other cells (downlink).

The goal of the G-RAKE receiver generally is to maximize the signal to interference plus noise ratio of the demodulated signal. To this end, a G-RAKE receiver typically includes a plurality of correlators, sometimes referred to as fingers, to separately despread different time-shifted signal images, and a combiner to combine the correlator outputs. A delay searcher processes the received signal to identify the delays corresponding to the strongest signal images (signal delays), and a finger placement processor determines the processing delays based on those signal delays. The process of finger placement comprises the allocation of a RAKE finger to each processing delay.

An example generalized RAKE (G-RAKE) receiver is described, e.g., in U.S. Pat. No. 6,363,104, which is incorporated herein by reference. The G-RAKE receiver was proposed to suppress interference in CDMA systems. See, e.g., G. Bottomley, T. Ottosson, Y.-P. B. Wang, "A Generalized RAKE Receiver for Interference Suppression"; IEEE Journal on Selected Areas of Communications, vol. 18, no. 8, pp. 1536-1545, August 2000. Interference suppression is achieved through a set of combining weights that account for correlation between the receiver fingers. The combining weights are given by Expression (1a)

$$w = R_u^{-1} h \qquad \text{Expression (1a)}$$

where w is a vector of combining weights, $R_u$ is an impairment covariance matrix (including both interference and noise), and h is a vector of net channel coefficients (the term "net" refers to the combined contribution of the transmit filter, radio channel g, and receive filter). Parametric computation of an impairment covariance matrix is described, e.g., in U.S. patent application Ser. No. 11/219,183, entitled "ADAPTIVE TIMING RECOVERY VIA GENERALIZED RAKE RECEPTION", and United States Patent Publication 2005/0201447/A1, both of which are incorporated herein by reference in their entirety. The impairment covariance matrix is also used to estimate signal quality, such as SINR, using for example $$SINR = h^H R_u^{-1} h \qquad \text{Expression (1b)}$$

Determining the impairment covariance matrix is typically a prerequisite to generating a proper set of combining weights. It is also a computationally demanding step that must be performed for each uplink user. Thus, the complexity of the G-RAKE solution may exceed the available baseband computation resources as the cell load increases.

Particularly described below are three existing general approaches for computing an impairment covariance matrix (or the related data correlation matrix). A first such approach is a nonparametric impairment covariance matrix approach.

There are two ways to realize the nonparametric impairment covariance matrix. The first approach works at the symbol level. In this first approach, the pilot channel (or pilot symbols) over a slot are used to compute a measurement of the impairment covariance matrix. The slot-to-slot measured impairment covariance matrices are averaged to give an estimate of $R_u$. As an example, consider the following sequence of three steps. First, channel estimates are computed from despread pilot symbols in accordance with Expression (2).

$$\hat{h} = \frac{1}{N_p} \sum_{k=0}^{N_p-1} x_{pilot}(k)s^*(k). \quad \text{Expression (2)}$$

Concerning Expression (2), $x_{pilot}(k)$ is a vector of despread pilot symbols across all fingers corresponding to the $k^{th}$ symbol in a slot, s(k) is the $k^{th}$ pilot symbol value, and $N_p$ is the number of pilot symbols in a slot. Then, a measurement of the impairment covariance matrix is computed using despread pilot symbols and the channel estimate in accordance with Expression (3).

$$\hat{R}_u^{meas} = \frac{1}{N_p-1} \sum_{k=0}^{N_p-1} (x_{pilot}(k)s^*(k) - \hat{h})(x_{pilot}(k)s^*(k) - \hat{h})^H. \quad \text{Expression (3)}$$

Finally, an estimate of the impairment covariance matrix is formed by averaging multiple measured impairment covariance matrices. A simple way of implementing this average is with an exponential filter such as that understood with reference to Expression (4).

$$\hat{R}_u(n) = \lambda \hat{R}_u(n-1) + (1-\lambda)\hat{R}_u^{meas}. \quad \text{Expression (4)}$$

In Expression (4), $\lambda$ is a filter parameter (e.g., forgetting factor) which determines how fast a previous estimate is phased out, and usually is a real value constant with a value between zero and one.

The second approach for the nonparametric impairment covariance matrix works at the chip level. The idea of the second approach is to form outer products of chip-level data for all delays of interest in accordance with Expression (5).

$$\hat{R}_d = \frac{1}{\left(\frac{2560}{C}\right)} \sum_{m=0}^{\left(\frac{2560}{C}\right)-1} y(mC)y^H(mC). \quad \text{Expression (5)}$$

In Expression (5), y(n) is a vector of chips corresponding to the desired delays for chip n in the current slot, C is the update rate, and (as in other expressions) the superscript H stands for Hermitian transpose. The update rate controls the complexity and performance of this approach. One can then use $\hat{R}_d$ in place of $R_u$ when computing combining weights provided that the soft bit information is properly adjusted prior to decoding, or an estimate of the impairment covariance matrix can be computed from Expression (6).

$$\hat{R}_u = \hat{R}_d - \hat{h}\hat{h}^H. \quad \text{Expression (6)}$$

A second approach for computing an impairment covariance matrix (or the related data correlation matrix) is the parametric impairment covariance matrix approach. Using the parametric impairment covariance matrix approach, a model is employed to construct the impairment covariance matrix. In the most general form, this model is given by Expression (7).

$$R_u = E_c(0)R_0^{own}(g_0) + \sum_{j=1}^{J} E_c(j)R_j^{own}(g_j) + N_0 R_n. \quad \text{Expression (7)}$$

In Expression (8), $g_j$ is a vector of medium channel coefficients corresponding to the channel between the $j^{th}$ uplink user and the base station, $E_c(i)$ represents the total energy per chip of uplink user j, and $N_0$ represents the power of the white noise passing through the receive filter. The assumption in Expression (7) is that user 0 is the one to be demodulated, while the matrix terms corresponding to users 1 through J represent interference. Therefore, $R_0^{own}(g_0)$ is a self-interference term. The entries of this matrix are given by Expression (8)

$$R_0^{own}(d_1, d_2) = \sum_{l=0}^{L_j-1} \sum_{q=0}^{L_j-1} g_0(l)g_0^*(q) \quad \text{Exp. (8)}$$

$$\sum_{\substack{m=-\infty \\ m \neq 0}}^{m=+\infty} R_{Tx/Rx}(d_1 - mT_c - \tau_0(l))R_{Tx/Rx}^*(d_2 - mT_c - \tau_0(q)).$$

The remaining terms represent other-user interference. The entries of these matrices are given by Expression (9)

$$R_j^{other}(d_1, d_2) = \quad \text{Expression (9)}$$

$$\sum_{l=0}^{L_j-1} \sum_{q=0}^{L_j-1} g_j(l)g_j^*(q) \sum_{m=-\infty}^{m=+\infty} R_{Tx/Rx}(d_1 - mT_c - \tau_j(l))$$

$$R_{Tx/Rx}^*(d_2 - mT_c - \tau_j(q))$$

In Expression (8) and Expression (9), $R_{Tx/Rx}(\Delta)$ represents the convolution of the transmit and receive filters evaluated at $\Delta$, $T_c$ is the chip duration, and $g_j(q)$ and $\tau_j(q)$ are the complex coefficient and path delay for the $q^{th}$ path of user j signal, respectively, and $d_1$ and $d_2$ are finger delays. Note the similarity of Expression (8) and Expression (9): only the m=0 term differentiates the two expressions.

A third approach for computing an impairment covariance matrix (or the related data correlation matrix) is the data correlation matrix approach. With $\hat{R}_u$, G-Rake combining weights can be formulated as $w = \hat{R}_u^{-1}\hat{h}$. Another approach is to use data covariance $\hat{R}_d$ in computing the combining weights, $w' = \hat{R}_d^{-1}\hat{h}$. Similar to the proof in H. Hadinejad-Mahram, "On the equivalence of linear MMSE chip-level equalizer and generalized RAKE", IEEE Commun. Lett., Vol. 8, pp. 7-8, January 2004, by using the matrix inversion lemma it can be shown that $w = \alpha w'$, where $\alpha$ is a positive scalar. Exploiting the relationship between w and w' and realizing the multiple G-Rake receivers in the uplink share the same receive samples, it has been proposed to use $\hat{R}_d$ in G-Rake combining weight formulation. See, in this regard, G. E. Bottomley, C. Cozzo, H. Eriksson, A. S. Khayrallah, Y.-P. E. Wang, "Reduced Complexity Interference Suppression for Wireless Communications", U.S. patent application Ser. No. 11/276,069 (incorporated herein by reference), according to which $\hat{R}_d$ can be estimated for a grid (or a set) of delays that cover all the finger delays among different uplink receivers. Then, $\hat{R}_d$ or $\hat{R}_d^{-1}$ can be shared by G-Rake receivers intended for different users.

Each of the three above-described approaches have shortcomings, as explained below.

Since there are two ways to realize the nonparametric impairment covariance matrix approach, each is considered separately. The major limitation of the nonparametric approach at the symbol level is the number of pilot symbols available to form measured impairment covariance matrices. Typically there are 10 pilots or less per slot. This means that the measured impairment covariance matrix is quite noisy, so significant averaging is required to get good demodulation performance. The required averaging limits the applicability of this approach to very low mobile speeds.

The limitation of the nonparametric form at the chip level is that one must trade performance for complexity. Simulations have shown that to achieve performance almost equivalent to the parametric form, computations in the chip-level nonparametric approach must be performed at the chip rate. For some performance loss, the chip-level nonparametric form may be computed at a reduced rate. While it has been estimated that the complexity of the chip-level variant is reasonable for a computation rate of C=16, some additional performance loss is incurred.

The limitations discussed above for the chip-level nonparametric impairment covariance approach apply to the data correlation matrix and to methods proposed in G. E. Bottomley, C. Cozzo, H. Eriksson, A. S. Khayrallah, Y.-P. E. Wang, "Reduced Complexity Interference Suppression for Wireless Communications", U.S. patent application Ser. No. 11/276,069, 2006 Feb. 13 since they all require estimating data covariance matrices based on chip samples.

The major limitation of the parametric impairment covariance matrix approach is the complexity. The complexity is directly proportional to the number of uplink users. Also, for each uplink user, the complexity is a function of the square of the number of paths and the square of the number of fingers. Thus the overall complexity can become prohibitive as the number of uplink users increases. Of course one could ignore all terms aside from self-interference (for example) to reduce complexity. This approach has been taken in the downlink. However, in the EUL scenario, there could be a large interferer that is not suppressed which would cause serious performance degradation.

What is needed, and an object of the present invention, are one or more of method, apparatus and technique to reduce the complexity of computing the impairment covariance matrix for each uplink user.

SUMMARY

The technology comprises method(s) and apparatus for operating a telecommunications system. In its basic form the method comprises providing plural channelization codes for potential use by an uplink (UL) receiver (e.g., an "anchor" uplink receiver); using unused codes of the plural channelization codes to generate an estimate of an impairment covariance matrix; and using the estimate of the impairment covariance matrix to form a processing parameter. For example, the processing parameter can be one or more weight values which, in turn, can be used for generating a combined output signal.

Thus, the technology affords an elegant way of making an estimate of an impairment covariance matrix, and particularly employment of unused codes to determine the estimate of the impairment covariance matrix. In an example mode and embodiment, generating the estimate of the impairment covariance matrix can comprise despreading the unused codes to obtain respective despread vectors and accumulating outer products of the despread vectors to obtain a generalized impairment covariance matrix.

The method can be employed and/or performed at a node of a radio access network, such as a base station node (also known as a BNode or NodeB) which comprises or serves plural uplink receivers, to form an estimate of the impairment covariance matrix for a particular uplink receiver known as an "anchor" uplink receiver or uplink receiver for a user of interest. An example mode and embodiment further comprises selecting, as the uplink receiver of the user of interest (the anchor uplink receiver), the one of the plural uplink receivers that has a strongest signal.

The technology further includes allowing one or more other (non-anchor) uplink receivers to deduce or derive, from the estimate of the impairment covariance matrix used by the anchor uplink receiver, a version of the impairment covariance matrix which is suitable for the respective one or more other (non-anchor) uplink receivers. Thus, in one of its aspects, the method provides an estimate of an impairment covariance matrix by employment of unused codes. In another of its aspects, the technology and method also comprises conveniently and compactly deducing (from, e.g., the estimate of the impairment covariance matrix for the anchor uplink receiver) the impairment covariance matrices for uplink receivers other than the anchor uplink receiver, e.g., for users other than the user of interest.

In an example mode and embodiment, the technology comprises using a first correction term to modify the estimate of impairment covariance matrix of the anchor uplink receiver to form a data correlation matrix. Then, to facilitate the compact deduction of versions of the impairment covariance matrix suitable for one or more other (non-anchor) uplink receivers, the technology comprises providing the data correlation matrix to another uplink receiver (e.g., to a non-anchor uplink receiver). For a non-anchor uplink receiver a correction term is employed to modify the data correlation matrix to obtain a corrected estimate of the impairment covariance matrix for use as the impairment covariance matrix by the non-anchor uplink receiver, e.g., an estimate of the impairment covariance matrix for the non-anchor uplink receiver. In an example mode, the correction term comprises an outer product of the net channel response for the other uplink receiver.

The method(s) can be implemented in more specific or detailed modes, such as a superset mode or a grid mode, for example.

In the superset mode, the act of generating the estimate of the impairment covariance matrix for the anchor uplink receiver comprises: obtaining delay values from plural uplink receivers; forming a superset comprising the delay values; associating G-Rake fingers with each of the delay values in the superset; determining an impairment covariance matrix using unused codes over all delay values in the superset; obtaining from the impairment covariance matrix a first subset of the impairment covariance matrix, the first subset pertaining to the delay values for an anchor uplink receiver; and, using the first subset of the impairment covariance matrix to form the processing parameter for the anchor uplink receiver.

To facilitate the compact deduction of an appropriate impairment covariance matrix for a non-anchor uplink receiver, the superset mode further comprises: using a first correction term to form the data correlation matrix; providing the superset and the data correlation matrix to a non-anchor uplink receiver; obtaining, from the first data correlation matrix, a second subset which pertains to the delay values for the non-anchor uplink receiver; using a correction term to form a corrected estimate of the impairment covariance matrix; and, using the corrected estimate of the impairment covariance matrix to determine the processing parameter for the non-anchor uplink receiver.

In the grid mode, the act of generating the estimate of the impairment covariance matrix for the anchor uplink receiver comprises: obtaining a maximum delay value and a minimum delay value from plural uplink receivers; forming a grid spanning the maximum delay values and the minimum delay value for the plural users; forming a set of delay values comprising all delays of the grid; determining an impairment covariance matrix using unused codes over all delay values in the grid; interpolating between entries of the impairment covariance matrix to create an interpolated impairment covariance matrix corresponding to the delay values for the anchor uplink receiver; using the interpolated impairment covariance matrix to form the processing parameter for the anchor uplink receiver.

To facilitate the compact deduction of an appropriate impairment covariance matrix for a non-anchor uplink receiver, the grid mode further comprises: using a first correction term to form a data correlation matrix; providing the grid and the data correlation matrix to a non-anchor uplink receiver; interpolating between entries of the data correlation matrix to create entries corresponding to G-Rake finger delays for the non-anchor uplink receiver; using a correction term to operate on the interpolated data correlation matrix and thereby form a corrected estimate of the impairment covariance matrix; using the corrected estimate of the impairment covariance matrix to form the processing parameter for the non-anchor uplink receiver.

In another aspect, the technology concerns a node of a telecommunications system. The node comprises an anchor uplink receiver, a communications device, and a non-anchor uplink receiver. The anchor uplink receiver comprises an impairment covariance matrix generator configured to utilize unused codes provided for potential use by plural uplink receivers to generate an impairment covariance matrix for the anchor uplink receiver. The communication device is configured to provide a matrix related to the impairment covariance matrix for the anchor uplink receiver to a non-anchor uplink receiver. The non-anchor uplink receiver is configured to use the matrix related to the impairment covariance matrix for the anchor uplink receiver to derive an impairment covariance matrix suitable for the non-anchor uplink receiver.

In an example implementation, the anchor uplink receiver further comprises a generator (e.g., a weight vector generator) configured to use the impairment covariance matrix to form a processing parameter (e.g., weight vector(s)) for the anchor uplink receiver.

In an example implementation, the anchor uplink receiver further comprises a unit configured to use a first correction term to form a data correlation matrix for the anchor uplink receiver. The communication device is configured to provide the data correlation matrix to the non-anchor uplink receiver.

In an example implementation, the non-anchor uplink receiver is configured to use a second correction term to modify the data correlation matrix to obtain a corrected estimate of the impairment covariance matrix, the corrected estimate of the impairment covariance matrix being for the non-anchor uplink receiver. In this regard, the non-anchor uplink receiver can comprise an outer product generator configured to generate the correction term by forming an outer product of a net channel response for the non-anchor uplink receiver.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" or "computer(s)" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
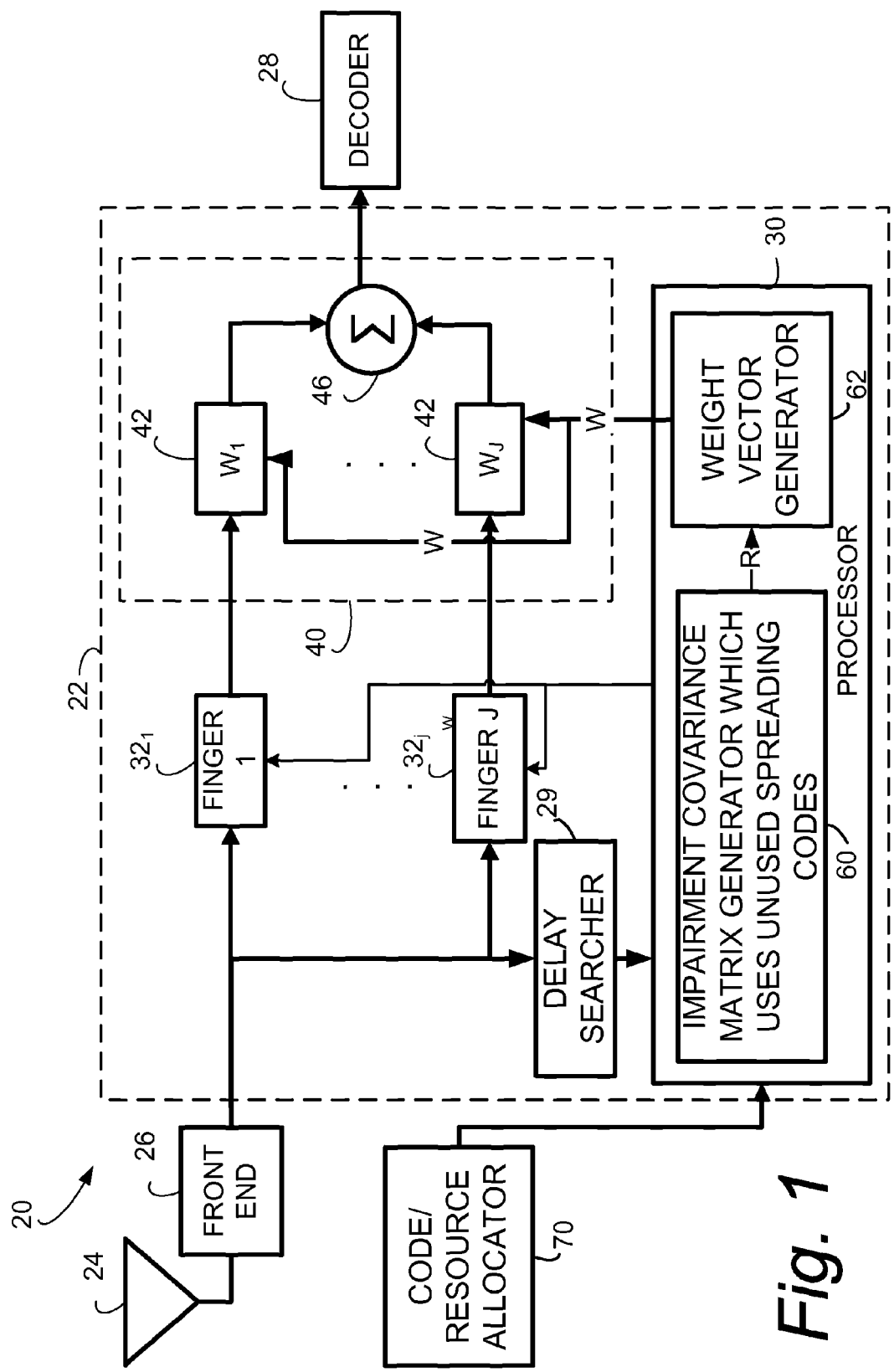
FIG. 1 is a diagrammatic view of an example embodiment of a device which employs unused spreading codes to generate an impairment covariance matrix.

FIG. 1 illustrates a representative wireless transceiver 20 which includes a set 22 of plural sub-receivers according to one example embodiment. The wireless transceiver 20 comprises one or more receive antenna(s) 24; receiver front-end 26, the set 22 of sub-receivers, and decoder 28. The set 22 of sub-receivers comprises or cooperates with delay searcher 29, processor 30, the plurality of sub-receivers which are also known as "fingers" 32 (e.g., fingers $32_1$ through $32_j$), and weighting network 40.

Receiver front-end 26 filters, down-converts, and samples the receive signal from antenna (antennas) 24 to generate a baseband signal for processing. The sampling interval may, for example, be one-half the chip period $T_c$. The signal samples from receiver front-end 26 are input to one or more fingers 32. Each finger 32 is assigned to a different multipath component of a received signal and essentially independently correlates with a single multipath component. At a later stage, the contribution of all fingers 32 are combined in order to capitalize upon the different transmission characteristics of each transmission path.

Delay searcher 29 identifies the individual signal images (e.g., the multipath components) in a received signal and determines the delay associated with each signal image. This information is passed to the processor 30. Each of the fingers 32 is associated with a particular receive antenna and a specific processing delay (the specific processing delay for each finger 32 is determined/assigned by processor 30 based on information supplied by delay searcher 29).

The weighting network 40 combines the outputs of the fingers 32 to generate a combined output signal. Decoder 28 decodes the combined output signal.

Figure 2:
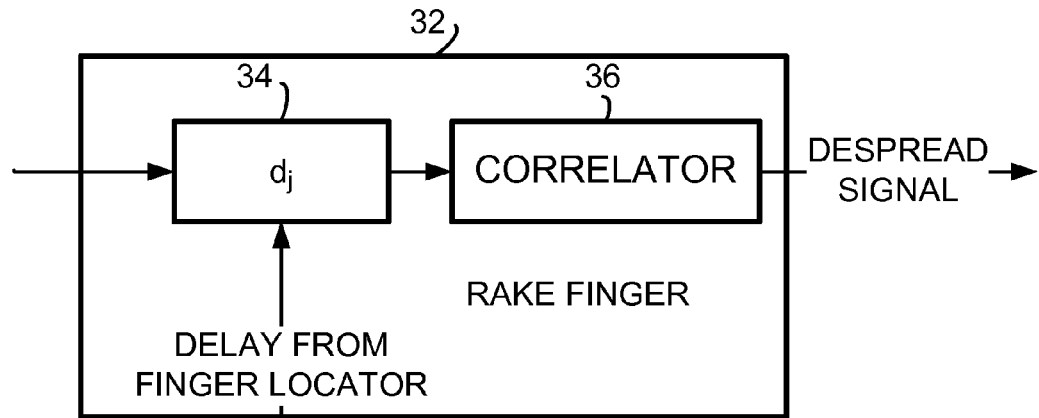
FIG. 2 is a diagrammatic view of a receiver finger according to an example embodiment.

As seen in FIG. 2, each finger 32 comprises delay element 34 and correlator 36. The delay element 34 aligns finger 32 with a selected processing delay by delaying the received signal by a configurable delay determined by processor 30. The correlator 36 correlates the delayed signal with a known spreading sequence associated with a desired signal to despread the received signal. As a result of the correlation process, unwanted signals contained in the received signal appear as noise to the receiver.

Weighting network 40 (see FIG. 1) weights and combines the despread signals output from the individual fingers 32. Weighting elements 42 apply a weighted coefficient to respective finger outputs. Combiner 46 combines the weighted output signals to generate a combined decision statistic, referred to herein as the combined output signal. The combined output signal is applied to decoder 28, which decodes the combined output signal to generate an estimate of the originally transmitted signal.

Figure 3:
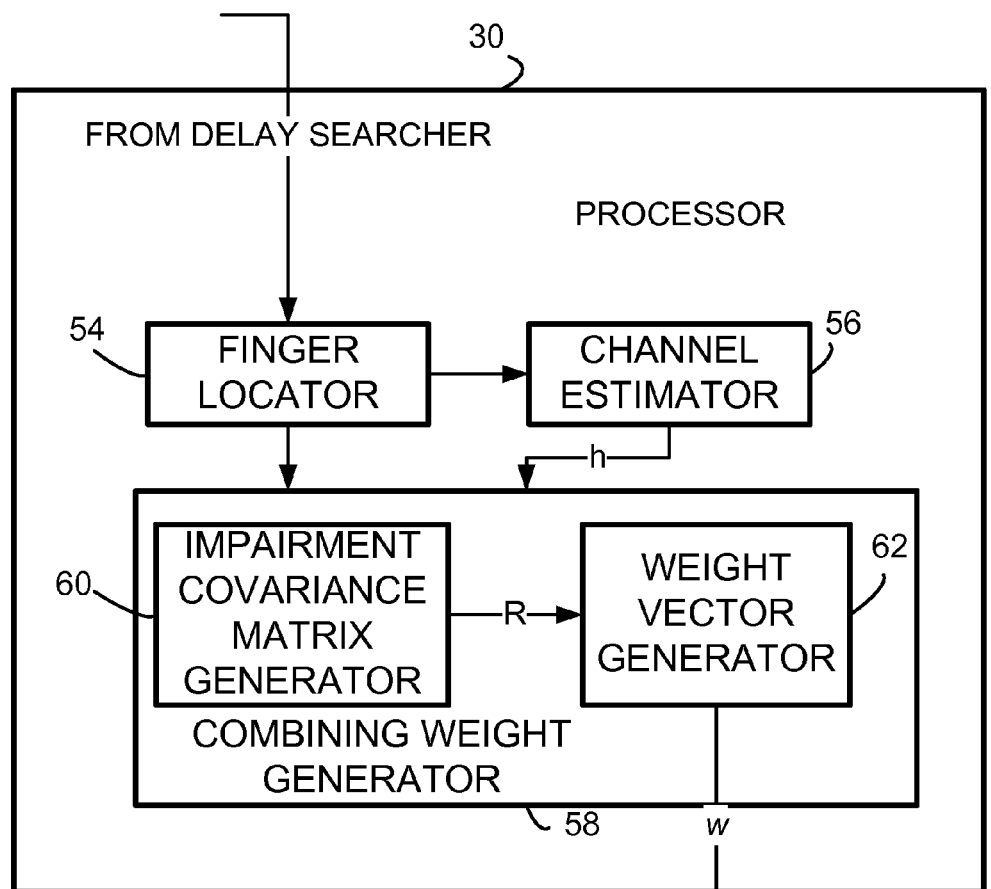
FIG. 3 is a diagrammatic view of a processor according to an example embodiment.

FIG. 3 illustrates an example embodiment of processor 30. The path delays of the detected signal images as determined by delay searcher 29 are input to processor 30. The processor 30 determines the number and placement of fingers 32 based on the path delay estimates provided by delay searcher 29. Additionally, processor 30 calculates weighting coefficients to be applied to the individual finger outputs. The processor 30 includes finger locator 54; channel estimator 56; and combining weight generator 58. As previously indicated, delay searcher 29 determines signal delays. The signal delays are sent to finger locator 54. Finger locator 54 determines the locations of the fingers 32 based on the estimated path delays reported by delay searcher 29 and assigns processing delays to the fingers 32. Channel estimator 56 generates estimates of the propagation channel from the transmitter to the receiver for each assigned finger 32. The channel estimates are provided to the combining weight generator 58.

Combining weight generator 58 computes the combining weights applied to the finger outputs. Combining weight generator 58 comprises impairment covariance matrix generator 60. The covariance matrix generator 60 computes impairment correlations across the fingers 32 and generates an impairment covariance matrix $R_u$. The combining weight generator 58 further comprises weight vector generator 62 which multiplies the vector of the net channel estimates h from the channel estimator 56 by the inverse of the impairment covariance matrix $R_u$ to generate a weight vector w whose elements are the weighting factors for the outputs of fingers 32. Alternatively, the combining weight vector can be obtained through using linear equation solution methods such as the Gauss-Seidel algorithm.

The particular wireless transceiver 20 shown in FIG. 1 happens to be a node of a radio access network (RAN) such as a radio base station, also known as a "B Node" or "NodeB". As such, the wireless transceiver 20 of the node operates on a downlink (DL) to send transmissions to plural wireless mobile terminals (e.g., user equipment units (UEs) or mobile stations (MSs)) which are served by the node of wireless transceiver 20. Conversely, wireless transceiver 20 of the node receives transmissions from the plural wireless mobile terminals on an uplink (UL).

The wireless transceiver 20 generically shown in FIG. 1 can take various forms or perform various functions. For example, wireless transceiver 20 and particularly its set 22 of sub-receivers can host or comprise one or more devices such as a RAKE receiver, a G-RAKE receiver, an uplink (UL) beam forming receiver, an interference rejection combining receiver, a whitening matched filter receiver, an equalizer (e.g., a block decision feedback equalizer, linear chip equalizer), an interference cancelling receiver (e.g., parallel interference cancelling receiver and/or serial interference cancelling receiver). Thus, the technology described herein for determining the impairment covariance matrix is applicable to any one or more of these devices.

For the generic wireless transceiver 20, orthogonal spreading codes are used to channelize physical data channels in the uplink signal (and downlink as well). In some implementations this orthogonal spreading code scheme is called OVSF (orthogonal variable spreading factor) spreading.

In an example implementation, each uplink user (e.g., uplink transmitter) is associated with a scrambling code. Plural channelization codes are scrambled by the user (transmitter)-specific scrambling code to "channelize" or "spread" the physical channels to be carried in a transmitted signal.

In general, not all spreading codes (channelization codes) at a particular spreading factor are used to channelize data; and these unused codes will also be called "unoccupied" codes. In the present example embodiments, these unoccupied or unused codes can be advantageously employed at wireless transceiver 20 of the radio base station receiver for, e.g., forming an impairment covariance matrix. In other words, and as explained in more detail herein, the unused spreading or channelization codes of the plural codes that are associated with an "anchor" user (or anchor scrambling code) are used to generate an estimate of the impairment covariance matrix. As explained above, the impairment covariance matrix has use in generating a proper set of combining weights. To this end, FIG. 3 shows the impairment covariance matrix $R_u$ as being applied to weight vector generator 62.

Figure 4:
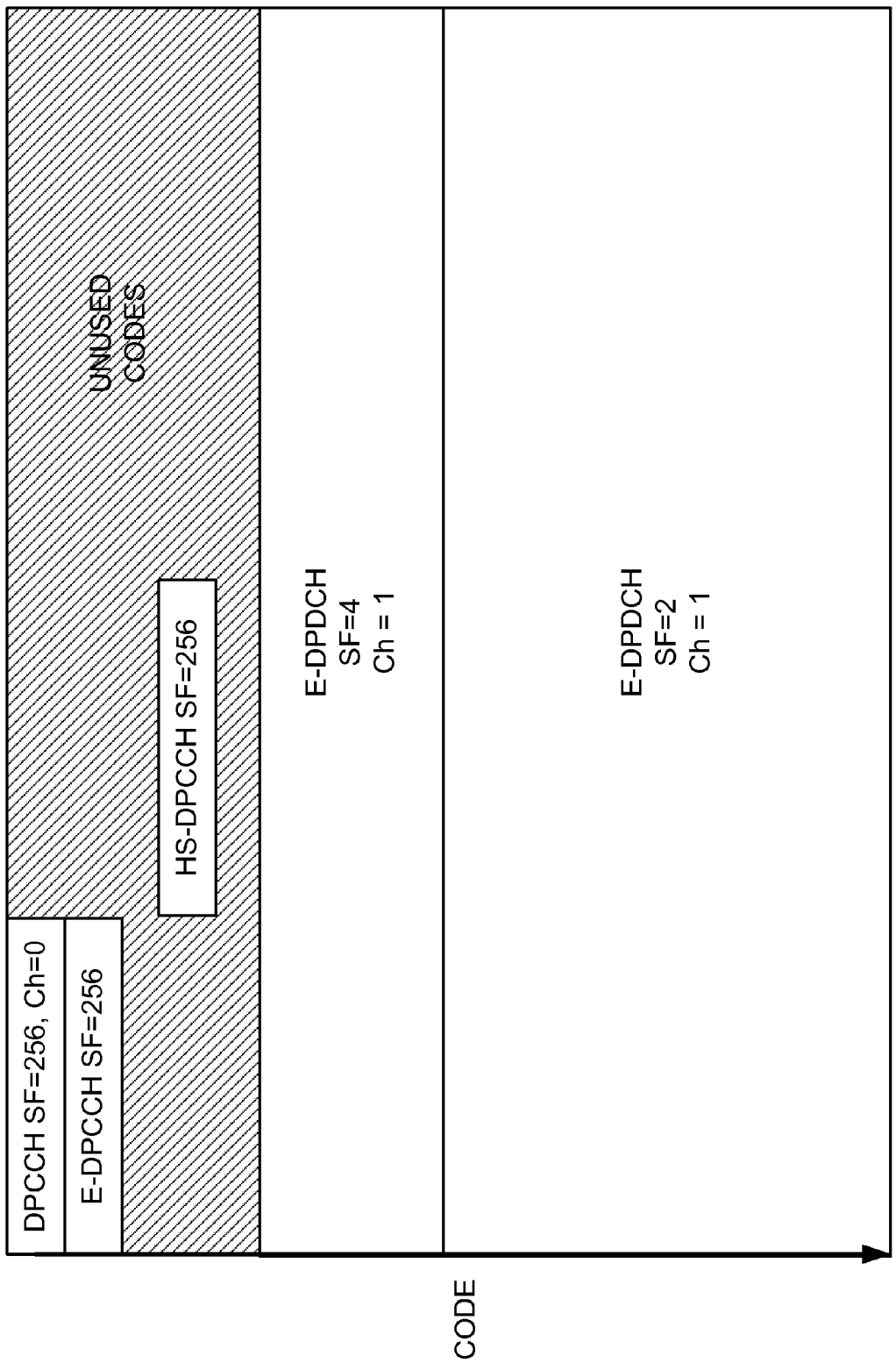
FIG. 4 is a diagrammatic view depicting code utilization for users having highest data rates on E-DPDCH.

FIG. 4 illustrates an example channelization coding allocation scheme and the existence of unused or unoccupied codes. FIG. 4 assumes a user is using the maximum code allocation for E-DPDCH. As shown in FIG. 4, one code of spreading factor (SF) 2 and one code of spreading factor (SF) 4 are used for E-DPDCH. In addition, one code of spreading factor (SF) 256 is used for DPCCH, and one code of spreading factor (SF) 256 is used for both HS-DPCCH and E-DPCCH through I/Q multiplexing. This allocation leaves 61 unused codes at spreading factor (SF) 256. The unused codes are represented by the hatched area in FIG. 4. For users requiring fewer codes on E-DPDCH, the number of unused codes would be even higher.

Figure 5:
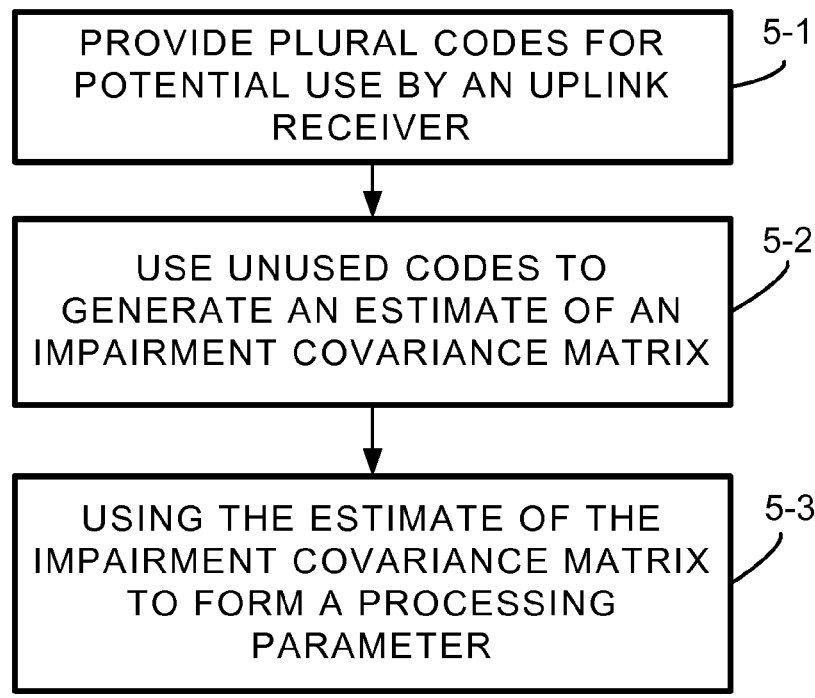
FIG. 5 is a flowchart showing basic, representative acts of steps involved in a generalized method of exploiting unused codes to generate an impairment covariance matrix.
Figure 5A:
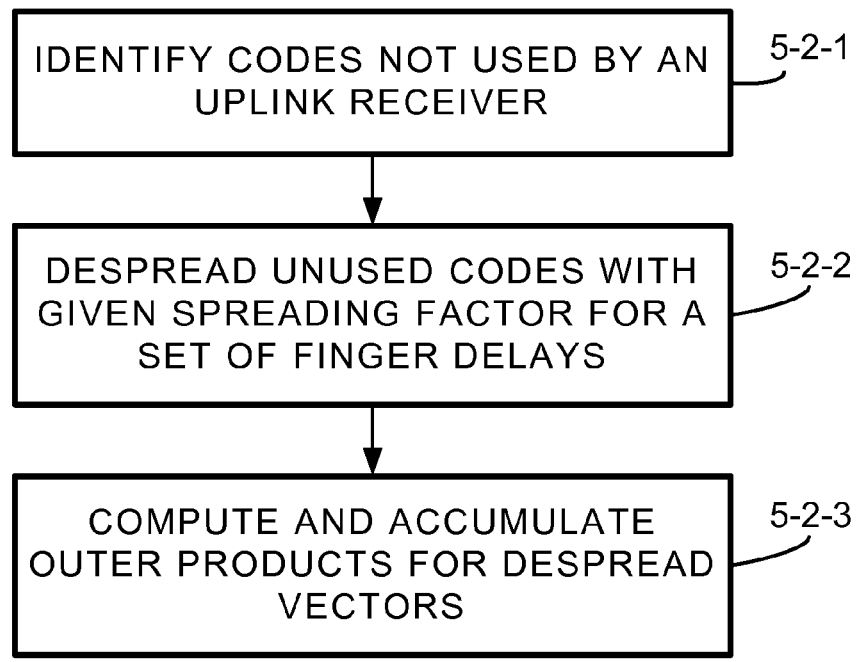
FIG. 5A is a flowchart showing basic subacts of an act of the method of FIG. 5.

The technology disclosed herein comprises method(s) and apparatus for operating a telecommunications system, and particularly for reducing the complexity of computing the impairment covariance matrix for one or more uplink users, e.g., one or more uplink receivers. Described below and in conjunction with FIG. 5 is an efficient solution that builds upon the notion of exploiting "unused codes" to generate the impairment covariance matrix. In its basic form the method illustrated in FIG. 5 comprises as act 5-1 providing plural codes for potential use by an uplink (UL) receiver (e.g., a particular receiver described herein as an "anchor" receiver). Act 5-2 comprises using the unused codes of the plural codes (in the manner illustrated in FIG. 4) to generate an estimate of an impairment covariance matrix. Act 5-3 comprises using the estimate of the impairment covariance matrix to form a processing parameter. For example, the processing parameter can be one or more weight values which, in turn, are can be used for generating a combined output signal (such as a RAKE or G-RAKE output signal, for example).

Thus, the technology affords an elegant way of making an estimate of an impairment covariance matrix, and particularly employment of unused codes to determine the estimate of the impairment covariance matrix. In an example mode and embodiment, generating the estimate of the impairment covariance matrix can comprise despreading the unused codes to obtain respective despread vectors and accumulating outer products of the despread vectors to obtain a generalized impairment covariance matrix.

Act 5-2 (the act comprising using the unused codes of the plural codes to generate an estimate of an impairment covariance matrix) builds upon the notion of exploiting "unused codes" to generate the impairment covariance matrix. Act 5-2 comprises subact 5-2-1 through subact 5-2-3 illustrated in Fig. A2. Subact 5-2-1 comprises identifying codes that are unused by an uplink user (e.g., by the anchor uplink (UL) receiver). Subact 5-2-2 comprises despreading the unused codes with a given spreading factor for a set of finger delays. Subact 5-2-3 comprises computing and accumulating outer products of the despread vectors in a manner such as that as shown and understood by Expression (10).

$$\hat{R}_u = \frac{1}{N_{code}\left(\frac{2560}{SF}\right)} \sum_{n=0}^{N_{code}-1} \sum_{k=0}^{\left(\frac{2560}{SF}\right)-1} x_n(k)x_n^H(k). \quad \text{Expression (10)}$$

In Expression (10) and elsewhere, $x_n(k)$ represents a vector of despread values for the $n^{th}$ unused code of spreading factor SF during the $k^{th}$ symbol interval. The term $x_n(k)x_n^H(k)$ is the outer product of column vector $x_n(k)$ with row vector $x_n^H(k)$, resulting in a rank 1 matrix.

Since there is no signal on any of the unused codes, it will be understood that Expression (10) is an estimate of the impairment covariance matrix. The quality of the estimate depends upon the number of codes ($N_{code}$) and the spreading factor (SF) used to despread the unused codes.

It should be understood from the foregoing that the "unused codes" is employed herein to refer to codes that are not used on a per user basis, e.g., codes not used by the anchor uplink (UL) receiver, for example. In the uplink, each user uses the same set of OVSF codes. For example, let codes {i,j,k,l} be a set of OVSF codes. Codes i & j can be used by both user 1 and user 2. And, for example, user 2 can further use code k. Thus, in short, user 1 uses codes {i,j} and user 2 uses codes {i,j,k}. In addition, users must be able to identify their own data. Accordingly, the set of OVSF codes are further scrambled by the user-specific scrambling code. After scrambling, effectively, user 1 has channelization codes {i',j',k',l'} and user 2 has channelization codes {i",j",k",l"}. These are different sets of resultant codes. Assume that user 1 is picked as the anchor user. In the case of user 1 being the anchor user, the "unused codes" that can be used for impairment covariance estimation are codes {k',l'}. Alternatively, if user 2 were picked as the anchor user, the "unused code" that could be used for the impairment covariance estimation is code {l"}. Thus, the notation of "unused codes" is viewed on a per-user basis.

Thus, as evident from the foregoing (and subsequently expanded in the context of further detailed embodiments and modes), the existence of unused codes has been capitalized upon to provide an impairment covariance matrix for an uplink user, e.g., for an uplink receiver.

In general, it is assumed that this technology including the generalized method of FIG. 5 will primarily but not necessarily exclusively be applied in the context of a base station. In a radio base station there likely are separate receivers for each uplink user. For present purposes a particular user is designated as the "user of interest" ("UOI"), and the receiver for that user of interest can be designated as the "anchor" uplink receiver. Any suitable criteria can be utilized for determining which uplink receiver is to be selected as the anchor uplink receiver, such as the enhanced uplink receiver with the strongest received signal, for example. Thus, in execution of the generalized method of FIG. 5, it is the receiver for the UOI (e.g., the anchor uplink receiver) that, as act 5-2 computes an estimate of the impairment covariance matrix for itself employing the unused code approach, such estimate of the impairment covariance matrix for the anchor uplink receiver now also being denominated by the mathematical notation ($\hat{R}_{u,UOI}$). As act 5-3, this estimate (($\hat{R}_{u,UOI}$)) is used to create weights for combining its own data, e.g., combining the data for the anchor uplink receiver.

Figure 5B:
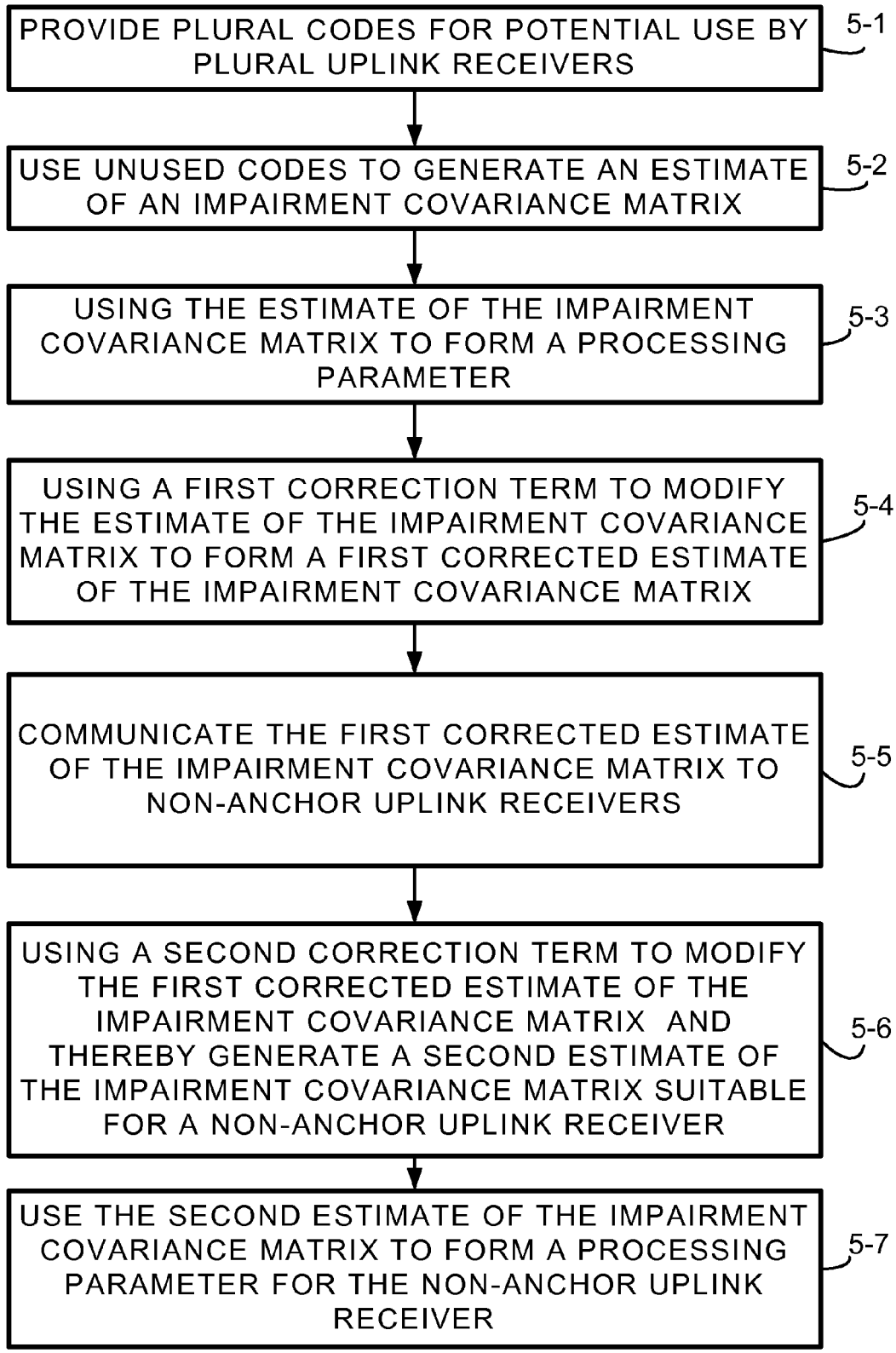
FIG. 5B is a flowchart showing further basic act that can be performed in conjunction with the method of FIG. 5.

As an optional and desirable addition, the technology can further comprise a compact technique for allowing one or more other (non-anchor) uplink receivers to deduce or derive, from a corrected estimate of the impairment covariance matrix determined (known as the data correlation matrix) provided by the anchor uplink receiver which is suitable for the respective one or more other (non-anchor) uplink receivers. Example acts for this multi-receiver technology are illustrated in FIG. 5B. Acts 5-1 through 5-3 of FIG. 5B resemble comparably numbered acts of FIG. 5, and accordingly are understood from the preceding discussion.

Act 5-4 of FIG. 5B comprises using a first correction term to modify the estimate of the impairment covariance matrix for the anchor uplink receiver (e.g., to modify the impairment covariance matrix computed as act 5-2), and thereby produce the data correlation matrix $\tilde{R}_d$. For example, as act 5-4, the receiver for the UOI (the anchor uplink receiver) can add a correction term to $\hat{R}_{u,UOI}$. As understood with reference to Expression (11), the correction term is $\hat{h}_{UOI}\hat{h}_{UOI}^H$, which is the product of a column vector $\hat{h}_{UOI}$ (which is a channel estimate of the net response for the user of interest) with a row vector $\hat{h}_{UOI}^H$, the result being a rank 1 matrix. The "net response" is the convolution of the TX pulse shaping filter, the medium coefficients, and the RX pulse shaping filter.

$$\tilde{R}_d = \hat{R}_{u,UOI} + \hat{h}_{UOI}\hat{h}_{UOI}^H, \quad \text{Expression (11)}$$

Act 5-5 of FIG. 5B comprises making the data correlation matrix (as determined at act 5-4) available to a non-anchor uplink receiver (e.g., one or more uplink receivers for users other than the user of interest). That is, the uplink receiver for the user of interest makes the estimate of the data correlation matrix $\tilde{R}_d$ available to the receivers for all other uplink users. In an example embodiment, the anchor receiver for the user of interest and other uplink receivers (for other users) can be located at one base station node. In implementation of act 5-5 the matrix $\tilde{R}_d$ can be communicated to the other users (e.g., the non-anchor uplink receivers) by any suitable communication device 116, such as (for example) a common bus, or written to a known location in a memory space or the like shared by all receivers. Note that the correction term of Expression (11) corresponds to the m=0 term that is omitted in Expression (8), and $\hat{h}_{UOI}$ corresponds to an estimate of the net channel response for the UOI).

Act 5-6 of FIG. 5B comprises the non-anchor uplink receiver receiving the estimate of the data correlation matrix (e.g., $\tilde{R}_d$) and using a correction term to modify the estimate of the data correlation matrix. In subtracting the correction term, an estimate of the impairment covariance matrix is generated. This corrected estimate of the impairment covariance matrix is a version of the impairment covariance matrix which is suitable for use by the non-anchor uplink receiver. That is, upon receiving the matrix $\tilde{R}_d$, as act 5-6 the other uplink user receiver(s) subtract from $\tilde{R}_d$ a correction term equal to the outer product of its/their own net channel response. For user p, the estimate of the impairment covariance matrix is understood from Expression (12).

$$\hat{R}_{u,p} = \tilde{R}_{d,p} - \hat{h}_p \hat{h}_p^H, \quad \text{Expression (12)}$$

In Expression (12), $\hat{h}_p$ is an estimate of the net channel response for user p. The correction given in Expression (12) removes the orthogonal part of self-interference (m=0 term from Expression (8)) and provides a proper impairment covariance matrix for user p. The description of $\tilde{R}_{d,p}$ will be given below.

Act 5-7 comprises the non-anchor uplink receiver using the corrected estimate of the impairment covariance matrix for determining a processing parameter (e.g., weighting value) for the non-anchor uplink receiver.

Figure 12:
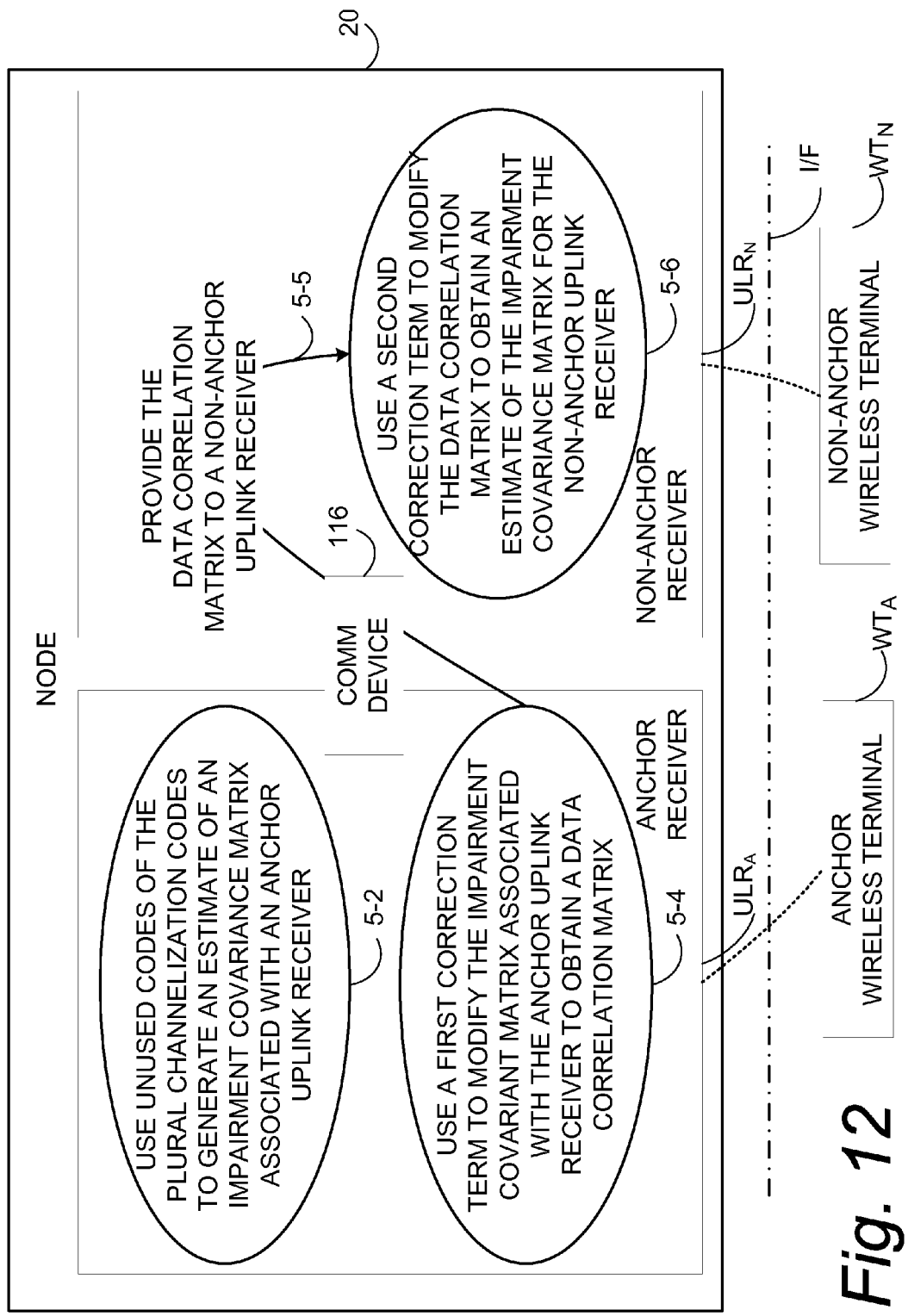
FIG. 12 is a diagrammatic view of a wireless node comprising an anchor uplink receiver and a non-anchor uplink receiver and further illustrating certain acts performed at/by the node.

For sake of illustrating various acts described above in context of uplink receivers, FIG. 12 shows wireless node 20 as comprising an anchor uplink receiver $ULR_A$ and a non-anchor uplink receiver $ULR_N$. The anchor uplink receiver $ULR_A$ of node 20 handles uplink communications from anchor wireless terminal $WT_A$; the non-anchor uplink receiver $ULR_N$ handles uplink communications from non-anchor wireless terminal $WT_A$. Both anchor wireless terminal $WT_A$ and non-anchor wireless terminal $WT_A$ communicate with wireless node 20 across a wireless (or radio) interface I/F. It will be appreciated that typically numerous non-anchor uplink receivers comprise or are accommodated by wireless node 20. In particular, FIG. 12 shows the aforementioned acts of using unused codes of the plural channelization codes to generate an estimate of an impairment covariance matrix associated with an anchor uplink receiver (act 5-2); using a first correction term to modify the impairment covariant matrix associated with the anchor uplink receiver to obtain a data correlation matrix (act 5-4); providing the data correlation matrix to a non-anchor uplink receiver (act 5-5); and using a second correction term to modify the data correlation matrix to obtain an estimate of the impairment covariance matrix for the non-anchor uplink receiver (act 5-6). For sake of convenience, FIG. 12 shows act 5-2 and act 5-4 within the boarder of anchor uplink receiver $ULR_A$ and act 5-6 within the boarder of non-anchor uplink receiver $ULR_N$. However, it will be understood that such within boarder illustration is solely for the purpose of associating those acts with the corresponding receiver, and that the acts can be performed by elements or functionalities of wireless node 20 that are not dedicated or confined to a particular receiver.

FIG. 12 also shows a communication device 116 which provides the data correlation matrix to the non-anchor uplink receiver $100_N$. As mentioned previously, the communication device 116 can be (for example) a common bus, or written to a known location in a memory space or the like shared by all receivers. Although FIG. 12 so happens to show data correlation matrix as being provided from anchor uplink receiver $ULR_A$ through communication device 116 to non-anchor uplink receiver $ULR_N$, it will be understood that the data correlation matrix can also be provided to non-anchor uplink receiver $ULR_N$ from another unit of node 20, such as a processor or controller, for example.

Given the general invention concept just described, two specific example embodiments are provided below. The two approaches are designated as the "superset" embodiment/mode and the "grid" embodiment/mode. These example embodiments differ in how the finger delays used in computing the impairment covariance matrix are handled.

Figure 7:
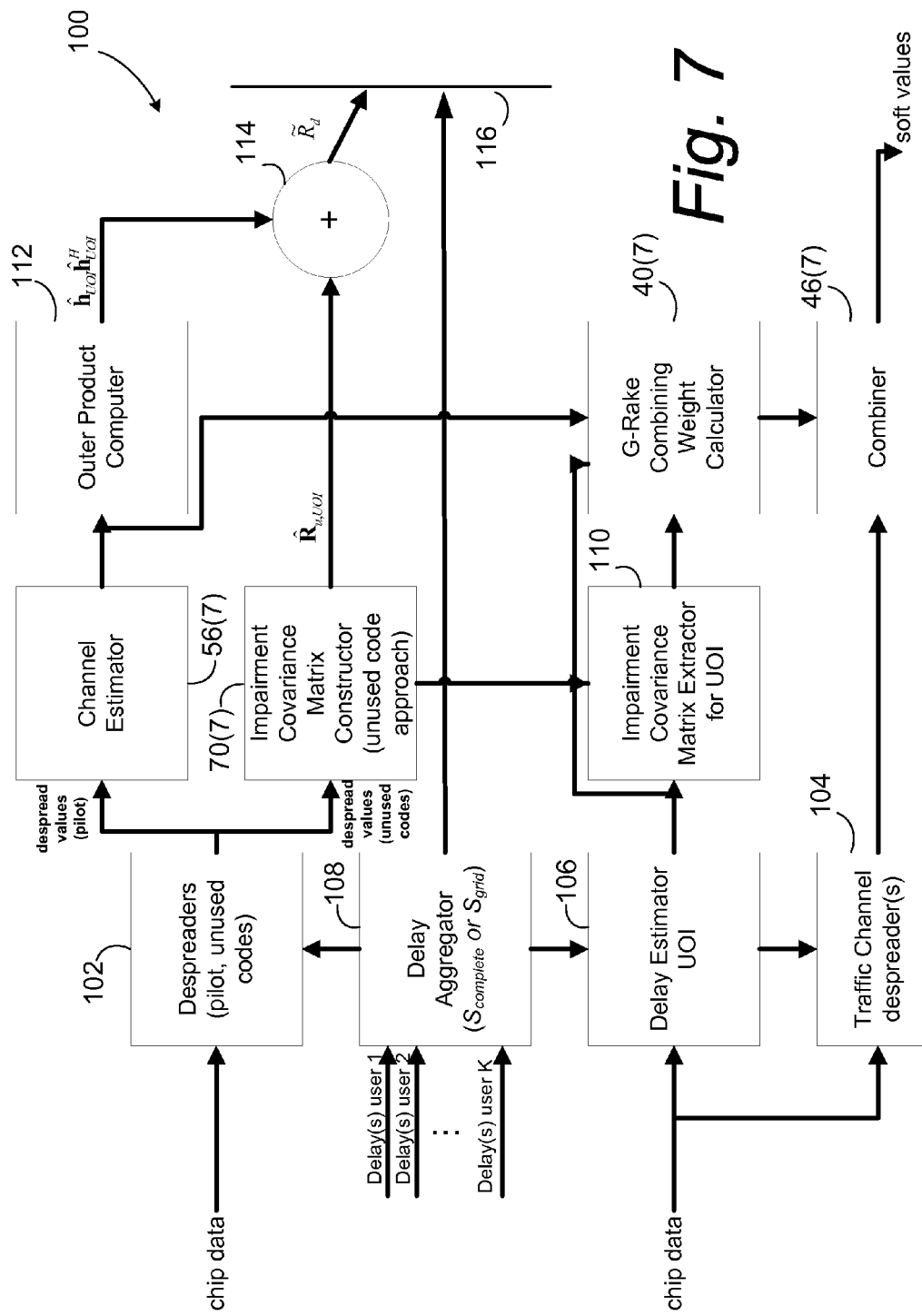
FIG. 7 is a diagrammatic view of receiver structure suitable for implementing acts of FIG. 6.
Figure 9:
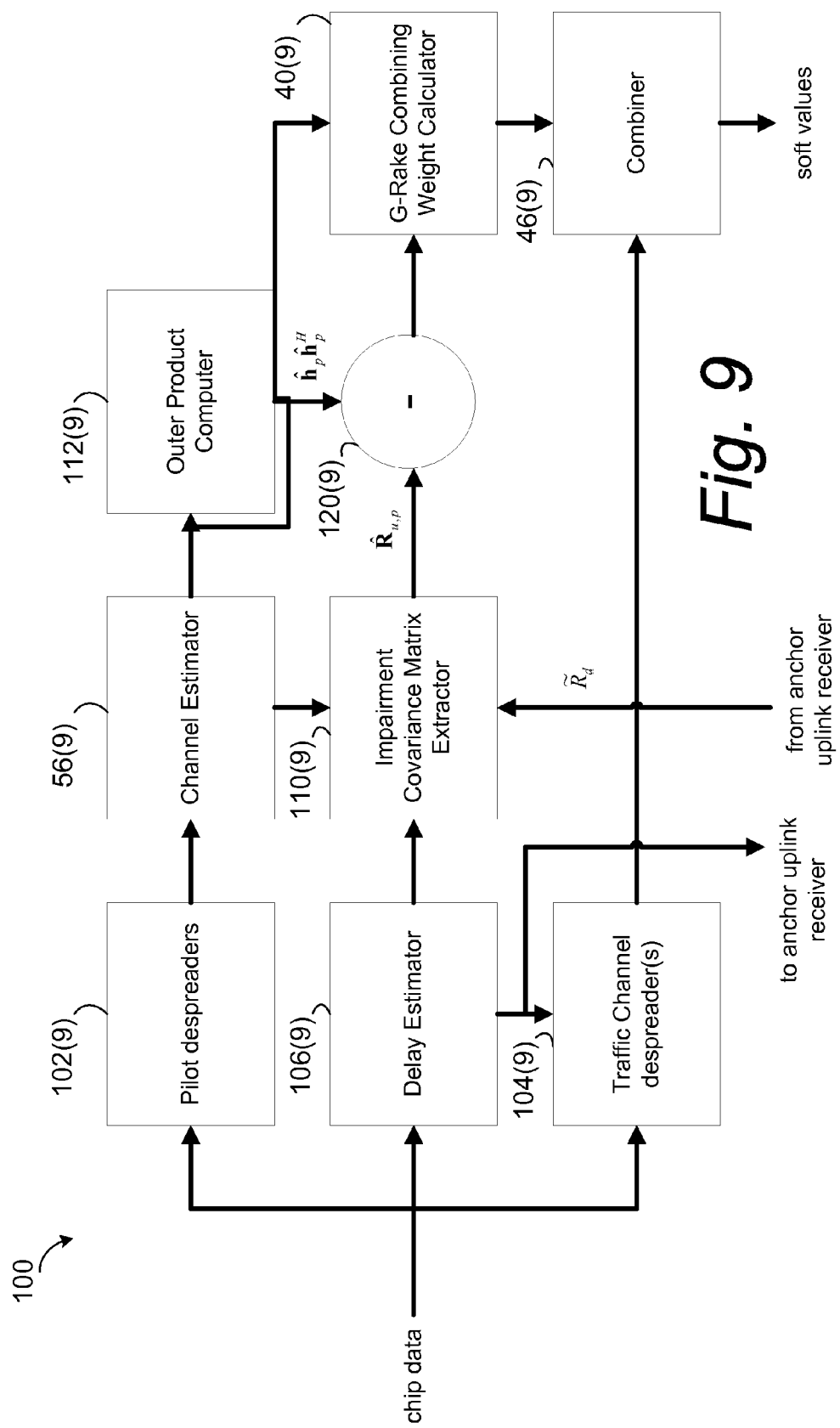
FIG. 9 is a diagrammatic view of receiver structure suitable for implementing acts of FIG. 8.

FIG. 7 shows portions of an example radio access network (RAN) node, such as a base station node, and particularly portions 100 which are suitable for determining a impairment covariance matrix for an anchor uplink receiver and for facilitating use of the anchor uplink receiver's impairment covariance matrix for determining appropriate impairment covariance matrices for one or more other uplink receivers (e.g., non-anchor uplink receivers). Thus, most of the structure shown in FIG. 7 is for or pertains to the anchor uplink receiver. On the other hand, FIG. 9 shows portions 101 of an example radio access network (RAN) node which are suitable for implementing acts or functions for an uplink receiver that is not the anchor uplink receiver, e.g., a non-anchor uplink receiver. The structures of FIG. 7 and FIG. 9 are applicable both to the "superset" embodiment/mode and the "grid" embodiment/mode. Further, it will be appreciated that one or more of the units or functionalities of FIG. 7 and FIG. 9 can be realized by one or more processors or controllers as those terms are herein expansively described.

The base station node portions 100 shown in FIG. 7 comprise three units that receive incoming chip data: despreaders 102 (for pilot and unused codes); traffic channel despreaders 104; and delay estimator 106 for the anchor uplink receiver. A delay aggregator 108 receives certain delays from uplink users (e.g., user 1 through user k) and forms an "aggregate", e.g., either a superset $S_{complete}$ (in the superset mode/embodiment) or a grid $S_{grid}$ (in the grid embodiment/mode). The aggregate (superset or grid) is communicated to despreaders 102 and delay estimator 106. The despread pilot codes from despreaders 102 are applied to channel estimator 56(7), the despread unused codes from despreaders 102 are applied to the impairment covariance matrix generator/constructor 60. The impairment covariance matrix generated by generator 60(7) and the delay estimate output by estimator 106 are provided to impairment covariance matrix extractor 110 (which, as hereinafter explained, extracts a impairment covariance matrix for the anchor uplink receiver). The channel estimate made by estimator 56(7), the delay estimate output by estimator 106, and the extracted matrix of unit 110 are applied to combining weight calculator 40(7). Combiner 46(7) receives the combining weights calculated by calculator 40(7) and the despread traffic channels (from despreader 104) to generate combined values (e.g., soft values that are fed to the soft-decoder). The channel estimate output by estimator 56(7) is applied to outer product computer 112. The output of outer product computer 112 (e.g., $\hat{h}_{UOI}\hat{h}_{UOI}^H$) and the impairment covariance matrix $\hat{R}_{u,UOI}$ generated by generator 60(7) are added at adder 114, to produce $\tilde{R}_d$. FIG. 9 shows portions 101 of an example radio access network (RAN) node which are suitable for implementing acts or functions for a non-anchor uplink receiver. The portions 101 shown in FIG. 9 comprise despreaders 102(9) (for pilot codes); traffic channel despreaders 104(9); and delay estimator 106(9) for the non-anchor uplink receiver. The delay estimator 106(9) for the non-anchor uplink receiver is the functionality that sends the delay(s) for this particular non-anchor uplink receiver to the delay aggregator 108 of FIG. 7. The despread pilot codes from despreaders 102(9) are applied to channel estimator 56(9). The channel estimate of channel estimator 56(9) is applied to outer product computer 112(9), which generates a correction term $\hat{h}_p\hat{h}_p^H$. The delay estimate provided by estimator 106(9) is provided to impairment covariance matrix extractor 110(9). The impairment covariance matrix extractor 110(9) receives the data correlation matrix $\tilde{R}_d$ from the structure of FIG. 7, and extracts a data correlation matrix $\hat{R}_{d,p}$ which is suitable for the non-anchor uplink receiver. A subtractor 120(9) subtracts the correction term $\hat{h}_p\hat{h}_p^H$ from the extracted data correlation matrix $\hat{R}_{d,p}$, and thus obtains a matrix suitable for use by combining weight calculator 40(9) for the non-anchor uplink receiver. Combiner 46(9) combines the weights calculated by combining weight calculator 40(9) and the despread traffic channels to produce combined values.

Having described example, non-limiting structure suitable for use with both the superset embodiment/mode and the grid embodiment/mode, these two example embodiments and modes are separately discussed.

Superset Embodiment/Mode

In the superset embodiment/mode, all uplink users communicate (e.g., make available) their finger delays to the anchor uplink receiver (e.g., the uplink receiver for the user of interest (UOI)). The finger delays can be made available over a shared bus or memory space. The uplink receiver for the UOI, and particularly delay aggregator 108) aggregates the delays and creates a superset $S_{complete}$ of active delays for all uplink users. For example, the superset $S_{complete}$ can comprise an ordered grouping of delays from earliest in time to latest in time, e.g., $S_{complete} \in \{d_0, d_1, \ldots, d_M\}$ wherein $d_0 < d_1 < \ldots < d_M$.

Figure 6:
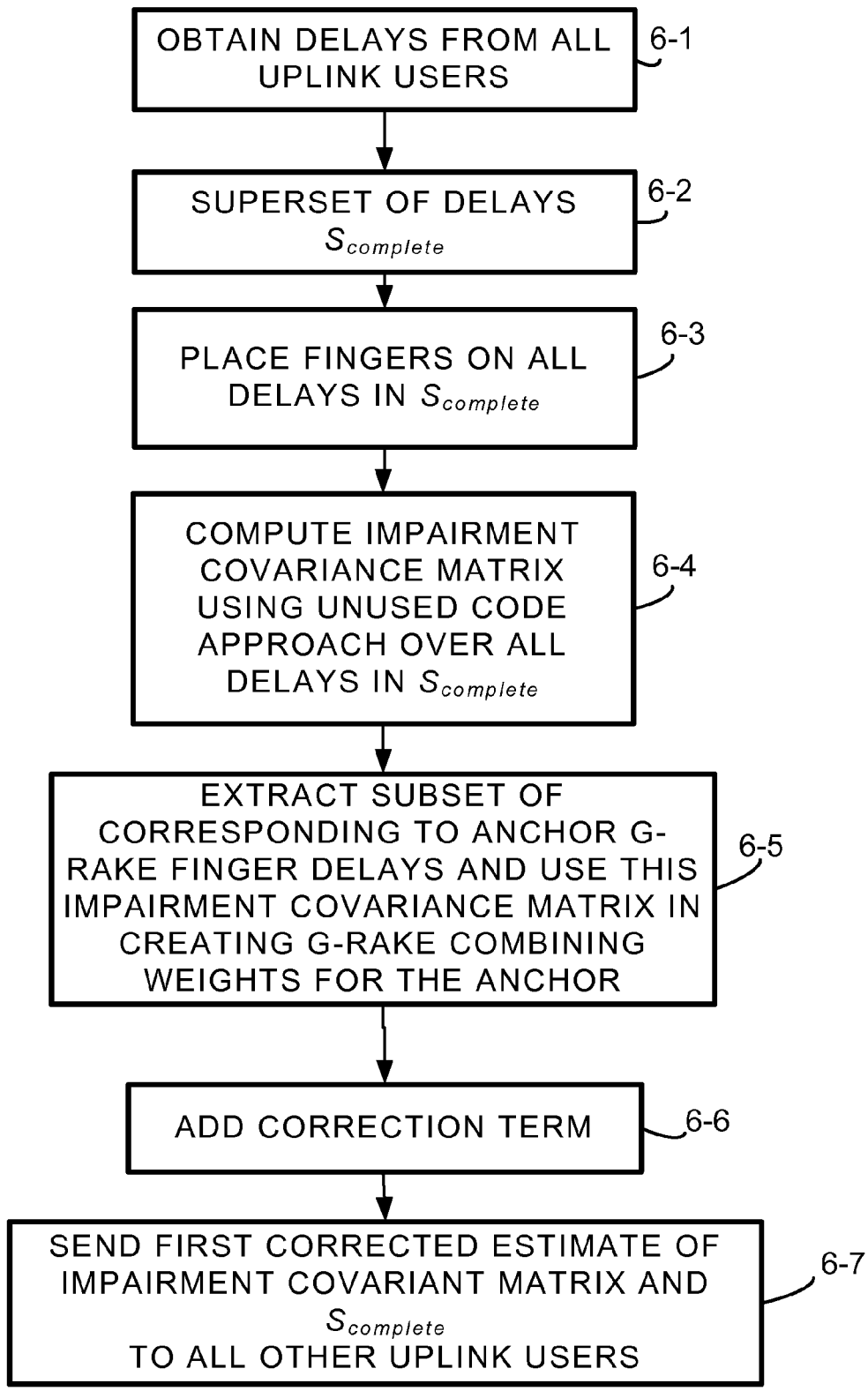
FIG. 6 is a flowchart showing example steps or acts involved for an anchor uplink receiver in a first mode of computing an impairment covariance matrix.

The receiver processing for the anchor uplink receiver (e.g., the uplink receiver for the "user of interest" (UOI) follows certain representative, steps or acts which are illustrated in FIG. 6. As act 6-1 comprises obtaining delays from all uplink users (e.g., by delay aggregator 108). These delays for the different uplink users are determined by and obtained from the delay estimator(s) of the respective uplink users, such as the delay estimator 106(9) of FIG. 9, for example.

Act 6-2 comprises creating the superset of delays, e.g., $S_{complete}$. In the FIG. 7 example embodiment, the superset of delays $S_{complete}$ is formed by delay aggregator 108.

Act 6-3 comprises associating fingers with all delays in $S_{complete}$. "Associating fingers" means that the finger locator assigns a finger to each delay in the superset.

Act 6-4 comprises computing the impairment covariance matrix $\hat{R}_{u,UOI}$ using unused code approach over all delays in $S_{complete}$ (e.g., by generator 60 in the FIG. 7 example embodiment). Act 6-4 thus comprises building an impairment covariance matrix for all delays.

Act 6-5 comprises extracting a subset of $\hat{R}_{u,UOI}$ corresponding to the finger delays for the anchor uplink receiver, and using this extracted subset as the impairment covariance matrix for creating combining weights for the anchor uplink receiver. The extraction can be performed by extractor 110; calculator 40(7) creates the combining weights.

Act 6-6 comprises adding the correction term $\hat{h}_{UOI}\hat{h}_{UOI}^H$ (as calculated by outer product computer 112) to the impairment covariance matrix $\hat{R}_{u,UOI}$ generated by generator 60(7) to form $\tilde{R}_d$ the data correlation matrix of the anchor uplink receiver as in Expression (11).

Act 6-7 comprises making $\tilde{R}_d$ (the data correlation matrix of the anchor uplink receiver) and $S_{complete}$ available to all other uplink users. As indicated above, $\tilde{R}_d$ and $S_{complete}$ can be made available through a bus or shared memory space or the like.

Figure 8:
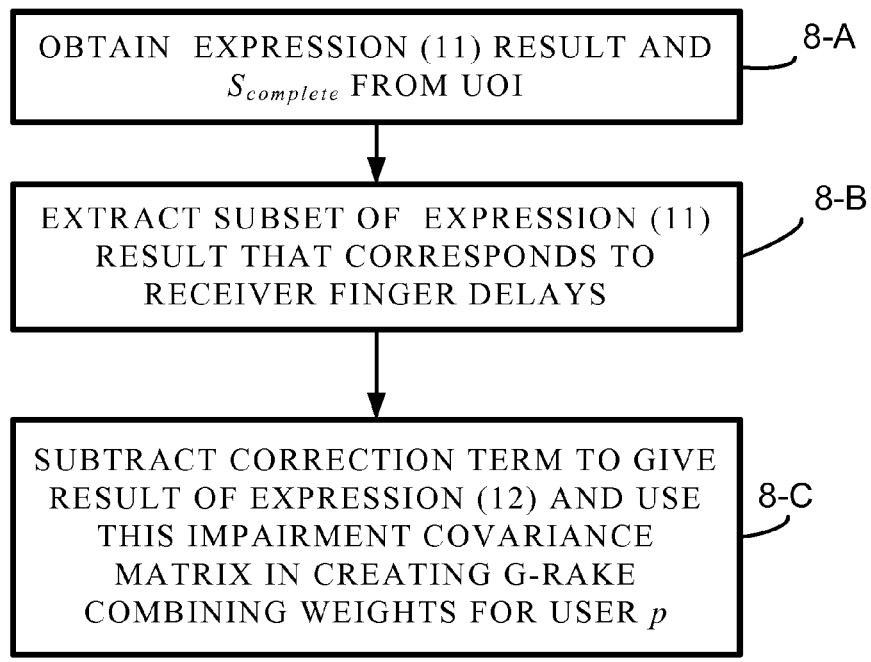
FIG. 8 is a flowchart showing example steps or acts involved for other users (other than an anchor uplink receiver) in a first mode of computing an impairment covariance matrix.
Figure 11:
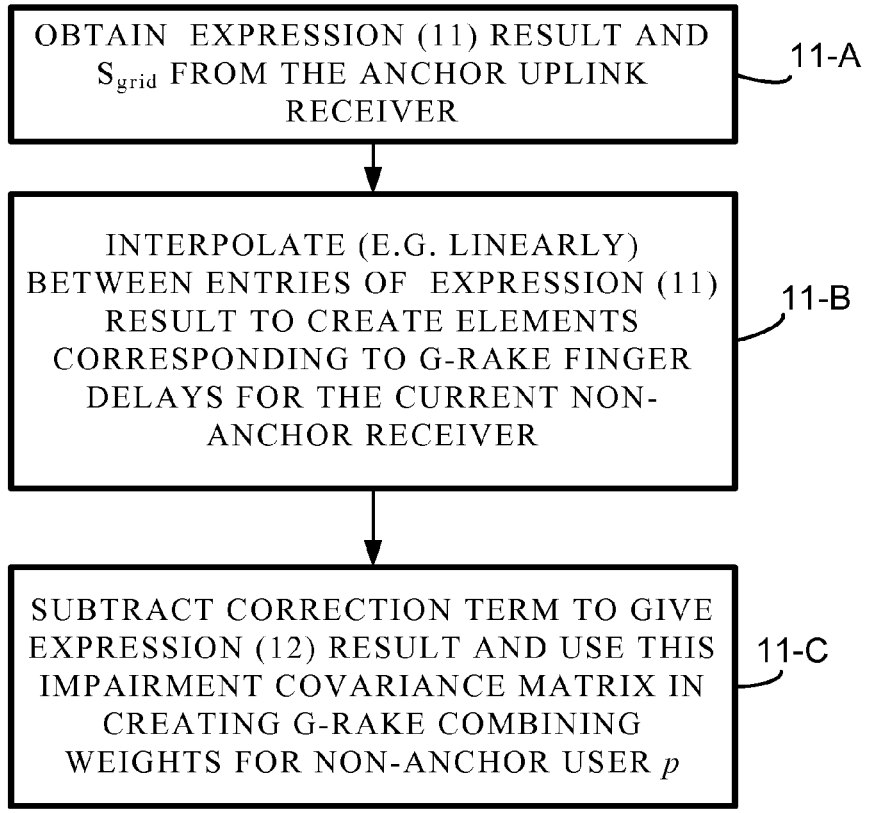
FIG. 11 is a flowchart showing example steps or acts involved for other users (other than an anchor uplink receiver) in the second mode of computing an impairment covariance matrix.

The receiver processing for the remaining uplink users (e.g., the non-anchor uplink receivers) comprises acts or steps which are illustrated in FIG. 8. Act 8-A comprises obtaining $\tilde{R}_d$ (the data correlation matrix of the anchor uplink receiver) and $S_{complete}$ from the UOI. The non-anchor uplink receiver needs $S_{complete}$ so that it can tell which entries in the matrix $\tilde{R}_d$ correspond to the delays associated with the non-anchor uplink receiver. Act 8-B comprises extracting a second subset of $\tilde{R}_d$, and particularly extracting a subset that corresponds to receiver finger delays of the non-anchor uplink receiver. Act 8-C comprises subtracting a correction term from $\tilde{R}_d$ to give $\hat{R}_{u,p}$ as in Expression (12), and also using this impairment covariance matrix ($\hat{R}_{u,p}$) in creating combining weights for the non-anchor uplink receiver (user p).

For this first embodiment it is advantageous to select one of the enhanced uplink (EUL) users as the anchor uplink receiver (UOI). Then, act 8-C for the non-UOI user(s) could be omitted for the non-UOI low data rate user, e.g., voice user(s). The power of such user(s) will likely be small in comparison to the EUL user(s), so the correction term will likely not make a performance difference. Act 8-C is important for the non-UOI EUL user(s) though.

Grid Embodiment/Mode

In a second example embodiment, all uplink users communicate maximum and minimum finger delays to the anchor uplink receiver In essence, the delay aggregator 108 of the anchor uplink receiver forms a grid of fingers that spans the maximum/minimum delays over all uplink users. The delay aggregator 108 of the anchor uplink receiver captures all delays in this grid of fingers in set $S_{grid}$.

Figure 10:
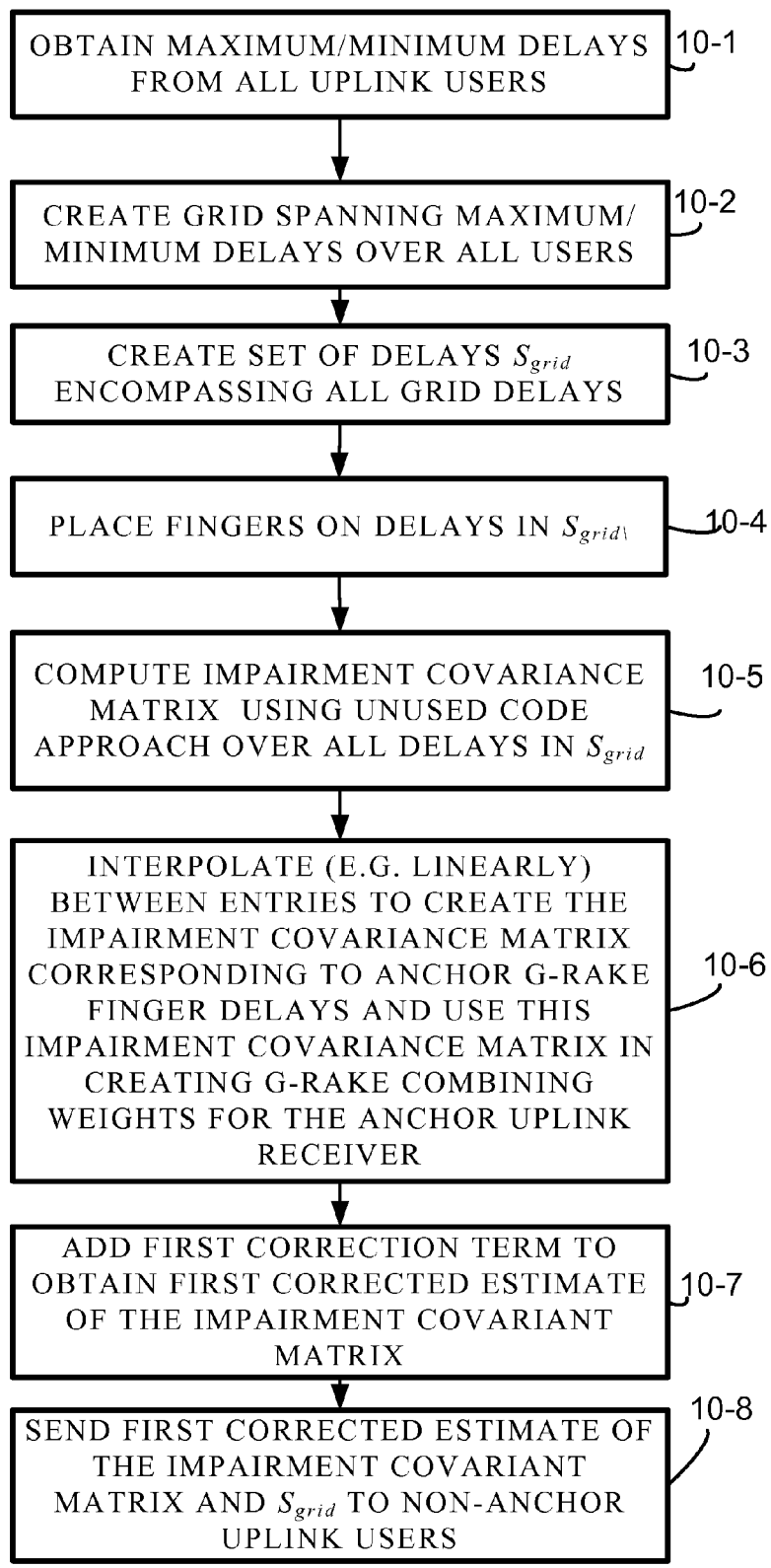
FIG. 10 is a flowchart showing example steps or acts involved for an anchor uplink receiver in a second mode of computing an impairment covariance matrix.

The receiver processing for the anchor uplink receiver for the grid embodiment/mode follows the basic acts or steps illustrated in FIG. 10. Act 10-1 comprises obtaining maximum/minimum delays from plural (preferably all) uplink users. The maximum/minimum delays from a non-anchor uplink user can be obtained from a delay estimator such as delay estimator 106(9) shown in FIG. 9. As indicated previously, these delays can be made obtained through a bus or common memory space, for example.

Act 10-2 comprises creating a grid spanning maximum/minimum delays over the plural uplink users. The grid can be created by delay aggregator 108 of FIG. 7, for example. The grid is the set of all delays $\{d_{min}, d_{min}+\delta, d_{min}+2\delta, \ldots, d_{max}\}$ where $d_{min}$ is the minimum delay across all users, $d_{max}$ is the maximum delay across all users, and $\delta$ is the grid spacing.

Act 10-3 comprises creating a set of delays $S_{grid}$ encompassing all grid delays Act 10-4 comprises associating fingers on with all delays in $S_{grid}$. "Associating fingers" means that the finger locator assigns a finger to each delay in the $S_{grid}$. For example, the finger locator assigns a finger to each delay in the set $\{d_{min}, d_{min}+\delta, d_{min}+2\delta, \ldots, d_{max}\}$.

Act 10-5 comprises computing an impairment covariance matrix $\hat{R}_{u,UOI}$ (using the unused code approach as previously described) over all delays in $S_{grid}$.

Act 10-6 comprises interpolating (e.g. linearly interpolating) between entries of the impairment covariance matrix $\hat{R}_{u,UOI}$ computed at act 10-5 to create the impairment covariance matrix corresponding to the anchor finger delays, and then using this interpolated impairment covariance matrix for creating combining weights for the anchor uplink receiver. In terms of interpolation, the impairment covariance function $K(d_1, d_2)$ depends only on finger delay differences (i.e. $K(d_1-d_2)$). The entries of the impairment covariance matrix $\hat{R}_{u,UOI}$ are samples of the impairment covariance function (i.e. $\hat{R}_{u,UOI}(d_1, d_2) = K(d_1-d_2)$. Therefore, one can reconstruct the impairment covariance function from the impairment covariance matrix. In fact, the first row of the impairment covariance matrix gives the impairment covariance function for delay differences of $\{0, \delta, 2\delta, 3\delta, d_{max}-d_{min}\}$.

Since the impairment covariance matrix is symmetric (or approximately so), the following substeps or subacts serve to linearly interpolate for the anchor uplink receiver. Act 10-6-1 comprises constructing an impairment covariance function $K(\lambda)$ from first row of $\hat{R}_{u,UOI}$ corresponding to $S_{grid}$ (note: $\lambda=0, \delta, 2\delta, \ldots, d_{max}-d_{min}$). Act 10-6-2 comprises obtaining delays for anchor uplink receiver. Act 10-6-3 comprises, for each UOI delay pair $(d_l, d_m)$, computing a delay difference $\psi = d_l - d_m$. Act 10-6-4 comprises locating impairment covariance function values $K(\lambda_1)$ and $K(\lambda_2)$ for which $\lambda_1 \leq \psi \leq \lambda_2$. Act 10-6-5 comprises constructing the estimate of $\hat{R}_{u,UOI}(d_l, d_m)$ via $$\hat{R}_{u,UOI}(d_l, d_m) = K(\lambda_1) + \frac{\psi - \lambda_1}{\lambda_2 - \lambda_1}(K(\lambda_2) - K(\lambda_1)).$$

Act 10-7 comprises adding a first correction term to form $\tilde{R}_d$ as in equation (11).

Act 10-8 comprises making $\tilde{R}_d$ and $S_{grid}$ available to all other uplink users.

The receiver processing for the remaining uplink users (e.g., the non-anchor uplink receivers) for the grid embodiment/mode comprises acts or steps which are illustrated in FIG. 8. Act 11-A comprises obtaining $\tilde{R}_d$ and $S_{grid}$ from the anchor uplink receiver. Although knowing its own delays, the non-anchor uplink receiver needs access to the delay set $S_{grid}$ so that interpolation can be performed (see below).

Act 11-B comprises interpolating (e.g. linearly interpolating) between entries of $\tilde{R}_d$ to create elements corresponding to finger delays for the current receiver.

Act 11-C comprises subtracting a correction term to give $\hat{R}_{u,p}$ as in Expression (12), and use the resultant impairment covariance matrix in creating combining weights for non-anchor user p.

Choosing an enhanced uplink (EUL) user to be the anchor uplink receiver is advantageous in that step 11-C may be omitted for the non-anchor low data rate users, e.g., voice user(s). Step 11-C is still included for non-anchor EUL user(s).

Although the description above contains many specificities, these should not be construed as limiting the scope of the invention but as merely providing illustrations of some of the presently preferred embodiments. Therefore, it will be appreciated that the scope of the present invention fully encompasses other embodiments which may become obvious to those skilled in the art, and that the scope is accordingly to be limited. All structural, chemical, and functional equivalents to the elements above-described which are known to those of ordinary skill in the art are expressly incorporated herein by reference and are intended to be encompassed hereby. Moreover, it is not necessary for a device or method to address each and every problem sought to be solved for it to be encompassed hereby.

What is claimed is:

1. A method of operating a telecommunications system comprising:
    providing plural channelization codes for potential use by an uplink receiver;
    using unused codes of the plural channelization codes to generate an estimate of an impairment covariance matrix associated with an anchor uplink receiver by:
    obtaining delay values from plural uplink receivers;
    forming a superset comprising the delay values;
    associating fingers with each of the delay values in the superset;
    determining the impairment covariance matrix using unused codes over all delay values in the superset;
    obtaining from the impairment covariance matrix a first subset of the impairment covariance matrix, the first subset pertaining to the delay values for an anchor uplink receiver;
    using the first subset of the impairment covariance matrix to form a processing parameter for the anchor uplink receiver.

2. The method of claim 1, further comprising:
    using a first correction term to modify the impairment covariant matrix associated with the anchor uplink receiver to obtain a data correlation matrix;
    providing the data correlation matrix to a non-anchor uplink receiver.

3. The method of claim 2, further comprising using the estimate of the impairment covariance matrix associated with the anchor uplink receiver to form a processing parameter for the anchor uplink receiver.

4. The method of claim 2, further comprising selecting, as the anchor uplink receiver, one of the plural uplink receivers that has a strongest signal.

5. The method of claim 2, wherein generating the estimate of the impairment covariance matrix comprises:

despreading the unused codes to obtain respective despread vectors;
accumulating outer products of the despread vectors.

6. The method of claim 2, further comprising:
using the estimate of the impairment covariance matrix associated with the anchor uplink receiver to generate weight values;
using the weight values for generating a combined output signal.

7. The method of claim 2, further comprising using a second correction term to modify the data correlation matrix to obtain an estimate of the impairment covariance matrix for the non-anchor uplink receiver.

8. The method of claim 7, wherein the second correction term comprises an outer product of the net channel response for the non-anchor uplink receiver.

9. The method of claim 1, further comprising:
using a first correction term to form the data correlation matrix;
providing the superset and the data correlation matrix to the non-anchor uplink receiver;
obtaining, from the first corrected subset, a second subset which pertains to the delay values for the non-anchor uplink receiver;
using a second correction term to form an estimate of the impairment covariance matrix for the non-anchor uplink receiver;
using the estimate of the impairment covariance matrix for the non-anchor uplink receiver to form the processing parameter for the non-anchor uplink receiver.

10. A method of operating a telecommunications system comprising:
providing plural channelization codes for potential use by an uplink receiver;
using unused codes of the plural channelization codes to generate an estimate of an impairment covariance matrix associated with an anchor uplink receiver by:
obtaining a maximum delay value and a minimum delay value from plural uplink receivers;
forming a grid spanning the maximum delay value and the minimum delay value across the plural users;
forming a set of delay values comprising plural delays of the grid;
determining the impairment covariance matrix using unused codes over the plural delay values in the grid;
interpolating between entries of the impairment covariance matrix to create an interpolated impairment covariance matrix corresponding to the delay values for the anchor uplink receiver;
using the interpolated impairment covariance matrix to form a processing parameter for the anchor uplink receiver.

11. The method of claim 10, further comprising:
using a first correction term to form the data correlation matrix;
providing the grid and the data correlation matrix to the non-anchor uplink receiver;
interpolating between entries of the data correlation matrix to create entries corresponding to finger delays for the non-anchor uplink receiver;
using a second correction term to operate on the data correlation and thereby form an estimate of the impairment covariance matrix for the non-anchor uplink receiver;
using the estimate of the impairment covariance matrix for the non-anchor uplink receiver to form the processing parameter for the non-anchor uplink receiver.

12. A node of a telecommunications system which is provided with plural channelization codes, the node comprising:
a processor which is configured to use unused codes of the plural channelization codes to generate an estimate of an impairment covariance matrix associated with an anchor uplink receiver by:
obtaining delay values from plural uplink receivers;
forming a superset comprising the delay values;
associating fingers with each of the delay values in the superset;
determining the impairment covariance matrix using unused codes over all delay values in the superset;
obtaining from the impairment covariance matrix a first subset of the impairment covariance matrix, the first subset pertaining to the delay values for an anchor uplink receiver;
using the first subset of the impairment covariance matrix to form a processing parameter for the anchor uplink receiver.

13. The apparatus of claim 12, further wherein:
the anchor uplink receiver comprises an impairment covariance matrix generator configured to utilize the unused channelization codes provided for potential use by the uplink receiver to generate the impairment covariance matrix for the anchor uplink receiver;
the apparatus further comprising:
a communication device configured to provide a data correlation matrix related to the impairment covariance matrix for the anchor uplink receiver to a non-anchor uplink receiver;
wherein the non-anchor uplink receiver is configured to use the data correlation matrix to derive an impairment covariance matrix suitable for the non-anchor uplink receiver.

14. The apparatus of claim 13, further comprising a generator configured to use the impairment covariance matrix to form the processing parameter for the anchor uplink receiver.

15. The apparatus of claim 13, wherein the impairment covariance matrix generator further comprises:
a despreader configured to despread the unused codes to obtain respective despread vectors;
an accumulator configured to accumulate outer products of the despread vectors.

16. The apparatus of claim 13, wherein the anchor uplink receiver further comprises:
a unit configured to use a first correction term to form an estimate of the data correlation matrix for the anchor uplink receiver;
wherein the communication device is configured to provide the data correlation matrix to the non-anchor uplink receiver.

17. The apparatus of claim 16, wherein the non-anchor uplink receiver is configured to use a correction term to modify the data correlation matrix to obtain an estimate of the impairment covariance matrix for the non-anchor uplink receiver.

18. The method of claim 17, further comprising an outer product generator configured to generate the second correction term by forming an outer product of a net channel response for the non-anchor uplink receiver.

19. The apparatus of claim 12, wherein the processor is further configured to generate the estimate of the impairment covariance matrix by:
using a first correction term to form the data correlation matrix;
providing the superset and the data correlation matrix to the non-anchor uplink receiver;

obtaining, from the first corrected subset, a second subset which pertains to the delay values for the non-anchor uplink receiver;

using a second correction term to form an estimate of the impairment covariance matrix for the non-anchor uplink receiver;

using the estimate of the impairment covariance matrix for the non-anchor uplink receiver to form the processing parameter for the non-anchor uplink receiver.

20. A node of a telecommunications system which is provided with plural channelization codes, the node comprising:

a processor which is configured to use unused codes of the plural channelization codes to generate an estimate of an impairment covariance matrix associated with an anchor uplink receiver by:

obtaining a maximum delay value and a minimum delay value from plural uplink receivers;

forming a grid spanning the maximum delay value and the minimum delay value across the plural users;

forming a set of delay values comprising plural delays of the grid;

determining the impairment covariance matrix using unused codes over the plural delay values in the grid;

interpolating between entries of the impairment covariance matrix to create an interpolated impairment covariance matrix corresponding to the delay values for the anchor uplink receiver;

using the interpolated impairment covariance matrix to form a processing parameter for the anchor uplink receiver.

21. The apparatus of claim 20, wherein the processor is further configured to generate the estimate of the impairment covariance matrix by:

using a first correction term to form the data correlation matrix;

providing the grid and the data correlation matrix to the non-anchor uplink receiver;

interpolating between entries of the data correlation matrix to create entries corresponding to finger delays for the non-anchor uplink receiver;

using a second correction term to operate on the data correlation and thereby form an estimate of the impairment covariance matrix for the non-anchor uplink receiver;

using the estimate of the impairment covariance matrix for the non-anchor uplink receiver to form the processing parameter for the non-anchor uplink receiver.

* * * * *